United States Patent [19]
Berg, Jr. et al.

[11] 3,753,341
[45] Aug. 21, 1973

[54] RAKE ATTACHMENT FOR ROTARY POWER MOWERS

[76] Inventors: Albert T. Berg, Jr.; Howard Langlie, both of Ellendale, Minn. 56026

[22] Filed: Sept. 22, 1972

[21] Appl. No.: 291,214

[52] U.S. Cl............... 56/400.04, 56/17.5, 56/295, 172/42, 56/193
[51] Int. Cl............................................. A01d 81/00
[58] Field of Search............... 45/17.5, 295, 400.04, 45/366, 367, 365, 193; 172/42, 111

[56] References Cited
UNITED STATES PATENTS

| | | |
|---|---|---|
| 3,015,929 | 1/1962 | Bright ................................ 56/193 |
| 3,184,903 | 5/1965 | Fjelstad............................. 56/17.5 |
| 3,117,633 | 1/1964 | Hosek ................................ 172/44 |
| 3,367,093 | 2/1968 | Zwickel ........................ 56/400.04 |
| 3,589,112 | 6/1971 | Frahmader....................... 56/295 |
| 3,611,691 | 10/1971 | Howard ............................. 56/367 |

Primary Examiner—Russell R. Kinsey
Attorney—Stuart R. Peterson

[57] ABSTRACT

A pair of polyethylene rake units are detachably mounted on the end portions of an elongated member carried at the lower end of the drive shaft of a rotary power mower blade. The embodiments are described, the rake units being held in both instances by channel-shaped retention means. In one embodiment, the holding is achieved by means of a separate channel-shaped adapter which is bolted to the underside of the usual blade attached to the drive shaft, whereas in the other embodiment the blade is removed and a specially configured elongated member is substituted in order to provide the requisite rake unit retention. Use of the adapter lends itself readily to the provision of a vane which produces a continuous trailing region of reduced pressure, thereby enhancing the raking action.

13 Claims, 5 Drawing Figures

PATENTED AUG 21 1973
3,753,341
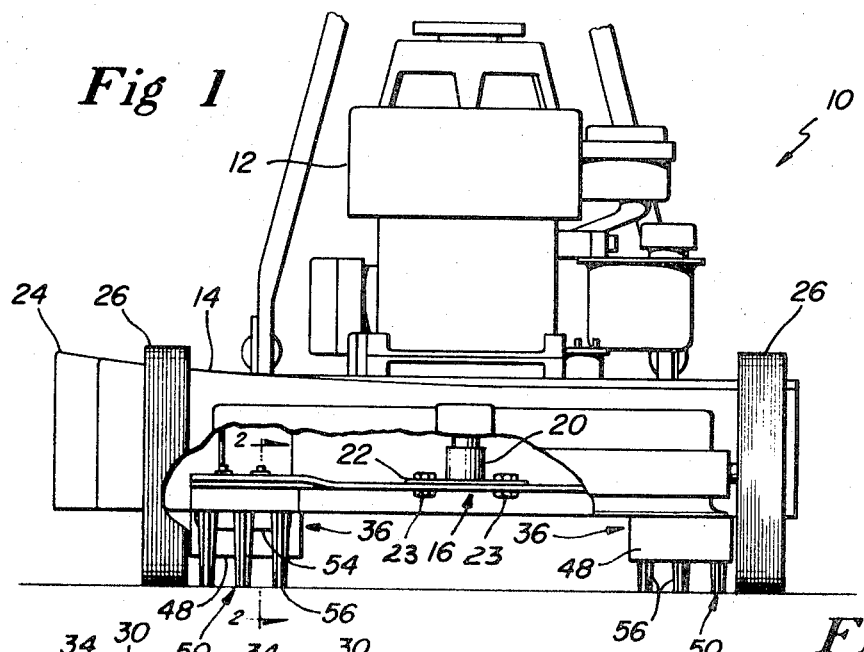
Fig 1
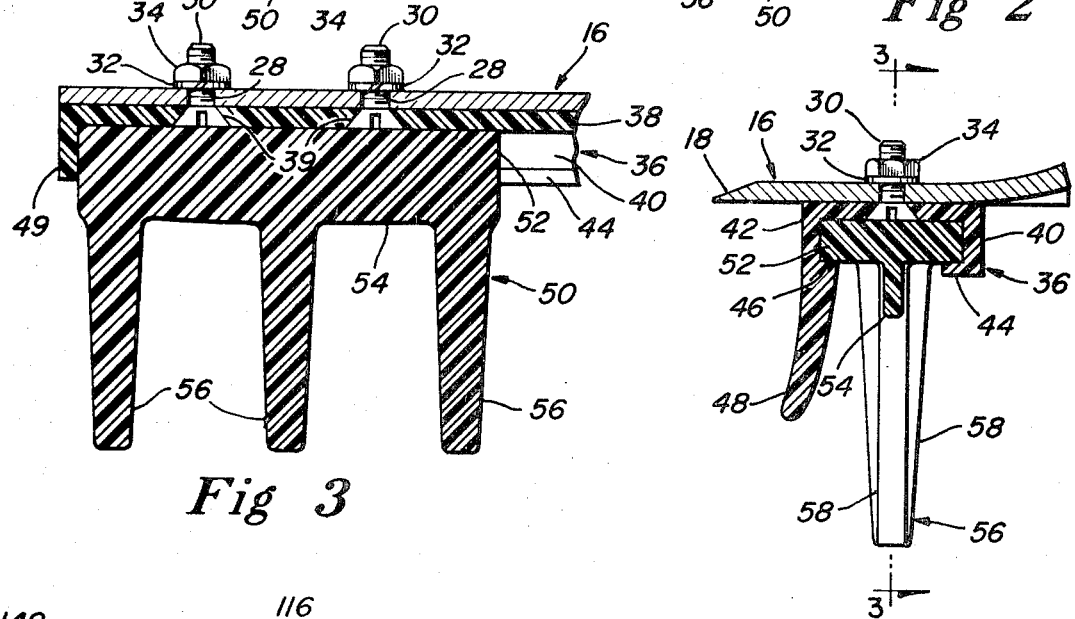
Fig 3
Fig 5
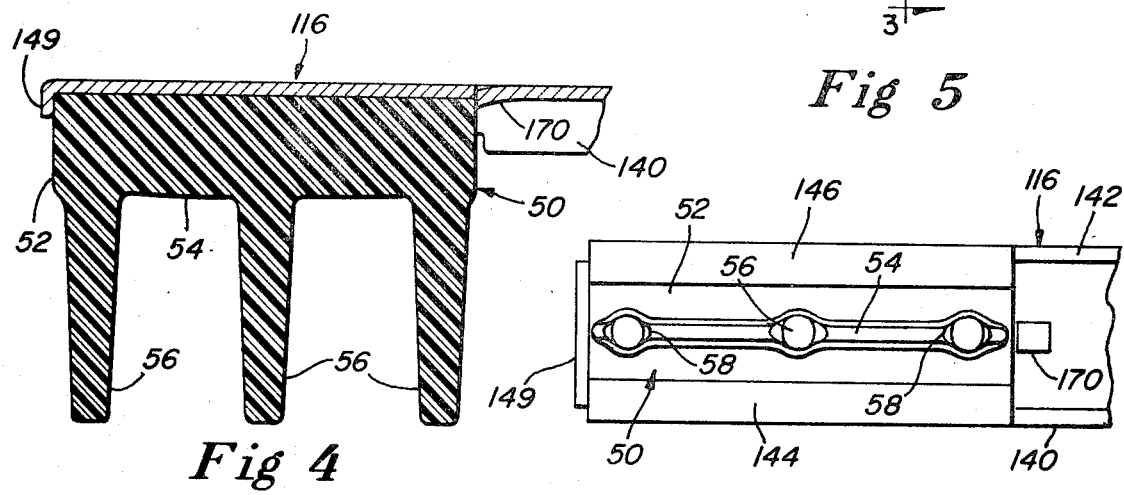
Fig 4

RAKE ATTACHMENT FOR ROTARY POWER MOWERS

BACKGROUND OF THE INVENTION

1. Field of the Invention

This invention relates generally to rotary power mowers, and pertains more particularly to a rake attachment therefor.

2. Description of the Prior Art

Various attempts have been made in the past to provide effective raking action in conjunction with the use of rotary lawn mowers. To my knowledge, none of these prior art arrangements have met with any degree of success. Some have ranged from being quite simple to being quite sophisticated. Not only has the cost of the more complicated ones militated against their widespread use, but in some instances the roots or tendrils of the grass have been destroyed or seriously impaired. Still further, the lack of resiliency in certain prior art schemes have contributed further to the danger of an already hazardous device in that a thin blade when impinging upon a rock or stone can cause the stone to be propelled with considerable force, sometimes striking the user of the mower or someone nearby; if the vertical dimension of the blade is increased, as is the case with certain previous rake attachments, then the situation is unnecessarily aggravated.

SUMMARY OF THE INVENTION

Accordingly, one object of the present invention is to provide a rake unit that can be attached to a rotary power mower that will not unduly harm the roots of the grass when performing its raking function.

Another object is to provide a rake unit that will be much safer than prior art arrangements with which I am acquainted. In this regard, not only is it planned that my rake unit be sufficiently resilient so as to minimize the ability thereof to propel stones and the like, but to enable the tines to break before they impart a hazardous amount of propelling force to stones or rocks. Stated somewhat differently, it is within the purview of the invention to provide a rake unit having optimum characteristics as far as resisting impact loads, yet breaking before kicking a stone with sufficient force that it becomes a dangerous missile. Concomitantly with the foregoing, it is to be recognized that the raking action is tempered so that the rather tender roots, as described above, will not be unduly damaged during the raking procedure.

Another object is to provide a lightweight raking unit with several tines thereon each of which is of such little weight that if it breaks off, such as when striking an object with sufficient impact, it will not cause any objectionable amount of unbalance as far as the overall mass of either the blade or the specially configured elongated member employed in lieu thereof is concerned. In other words, a given tine is a small fraction of the total mass of the rotating structure and the user can continue to rake the lawn even after a tine has become broken.

Yet another object of the invention is to provide plastic tines that can be cut easily to the requisite length. In this regard, it is intended that, if need be, all of the tines initially be cut so that they provide just the amount of raking action for a given height setting of the rotary blade.

As mentioned above, when a tine becomes broken, the raking operation can progress without the user stopping the mower, but if he wishes to proceed with a lesser degree of raking efficiency, he can cut back the corresponding tine on the diametrically opposite rake unit, thereby restoring the rather fine balance that has existed up to the time that a tine is broken, an aim of the invention being to permit this.

Further, an object of the invention is to provide a rake unit that can be replaced in the field without the aid of any tools or implements. More specifically, all that is required is that the old unit be slipped out and the new unit substituted in its stead. It is planned that the user carry an extra rake unit in his pocket, using it as a spare if circumstances so dictate.

Still further, it is within the contemplation of the invention to provide a rake unit that can be readily attached to conventional rotary blades through the expedient of a simple adapter, or if the manufacturer of the mower or other supplier elects to produce a specially configured elongated member to be substituted for the blade, then the rake unit lends itself easily to being attached to such elongated member.

Another object is to provide a plastic rake unit that will be extremely inexpensive to manufacture and capable of being sold at such a low price that the user will not object to replacing a unit whenever a tine, or tines, thereon become broken.

A further object is to provide a rake unit lending itself readily to conventional molding techniques.

Still another object is to provide an integral vane on an adapter that will produce a trailing region of lesser pressure which will assist in elevating the grass and leaves to be raked, thereby contributing to a more efficient raking operation.

Briefly, my invention includes either a channel-shaped adapter which can be easily bolted to the underside of a conventional rotary blade for power mowers, the rake unit then being slipped into place without the need for any tools. On the other hand, the invention contemplates a modified form of rotative supporting structure in which the end portions of such member are channel-shaped so that the same rake unit can be easily inserted. In both instances, the rake unit is effectively held and can only be removed intentionally when it is necessary to do so. Particularly suited for the embodiment making use of an adapter is a vane that extends downwardly so as to create a partial vacuum therebehind, thus inducing dead grass and leaves to be raised by reason of the reduced pressure region. In this way, a more efficient and complete raking operation is assured.

BRIEF DESCRIPTION OF THE DRAWINGS

FIG. 1 is a front elevational view of a typical rotary power mower, a portion of the casing being broken away so as to expose more completely one of the rake units and the manner in which it is attached to the underside of the mower blade;

FIG. 2 is an enlarge sectional view taken in the direction of line 2—2 of FIG. 1;

FIG. 3 is a sectional view taken in the direction of line 3—3 of FIG. 2;

FIG. 4 is a sectional view corresponding to FIG. 3 but depicting a portion of an elongated member intended to be substituted for the blade so as to hold the rake unit without resort to the adapter utilized in FIG. 3, and FIG. 5 is a bottom plan view of FIG. 4.

DESCRIPTION OF THE PREFERRED EMBODIMENTS

In FIG. 1, a conventional rotary power mower has been denoted in its entirety by the reference numeral 10. It will be understood at the outset that the invention hereinafter described will find utility in both the walk-behind type of mower, this being the model illustrated in FIG. 1, or the ride type. In either event, the typical mower has a motor 12 and a casing 14, the casing 14 in FIG. 1 having a portion thereof removed so as to expose to view a blade 16 having a cutting edge 18 (FIG. 2). The blade 16 is attached to the lower end of a drive shaft labeled 20, the blade having a pair of spaced holes therein having the same spacing as holes in a strip 22. Bolts 23 extend through the holes in order to detachably mount the blade 16. The casing 14 further includes a discharge spout at 24 via which cut grass is normally discharged and via which leaves, dead grass and other debris that is raked when following the teachings of the present invention is discharged. The mower 10 further includes a plurality of wheels 26, as is also conventional. It will be understood that the wheels 26 are adjustable with respect to the casing 14, thereby permitting the blade 16 to be raised or lowered relative the ground, this being conventional as far as lawn mowers of this type are concerned.

FIG. 1 illustrates one embodiment of my invention. FIGS. 2 and 3 show with greater clarity the embodiment appearing in FIG. 1. From FIG. 3, it will be discerned that the blade 16 is provided with a pair of radially aligned holes 28. These holes can easily be drilled by the user. However, blades can be drilled at the factory when it is intended that my rake attachment be used in conjunction therewith. At any rate, a pair of flat headed bolts 30 are shown, these bolts extending upwardly through the holes 28 in the blade 16 and also upwardly through washers 32, there being a pair of nuts 34 which anchor the two bolts to the blade 16. The blade 16 is similarly drilled at its opposite end and two additional bolts 30 will also be used at this other end.

Inasmuch as the embodiment pictured in FIGS. 1–3 contemplates the use of my invention with a conventional blade 16, an adapter 36 is shown. The adapter 36 can be fabricated from either metal or a suitable plastic, such as linear polyethylene. In either situation, the adapter 36 is of channel-shaped configuration having a web or strip portion 38 formed with chamfered holes 39 having the same spacing as the holes 28 plus downwardly extending side walls 40 and 42. The side wall 40, as can be best understood from FIG. 2, has an inwardly directed lip or flange 44. Somewhat similarly, the side wall 42 has a lip or shoulder at 46. The difference between the two side walls 40 and 42 resides in the fact that the side wall 42, this being the leading wall, has depending therefrom an integral vane 48. As the vane 48 is rotated in unison with the blade 16, it creates a partial vacuum at the rear, this region of reduced pressure constantly trailing the vane and helping with the raking action as will hereinafter become clearer. Although its function will be better understood hereinafter, a stop or end wall 49 extends across the outer or left end, as viewed in FIG. 3, of the adapter 36.

At this time, attention is directed to my rake unit denoted generally by the reference numeral 50. It is fabricated entirely of linear polyethylene which possesses an appropriate degree of resiliency, particularly when coupled with the relative dimensioning thereof which dimensioning is readily apparent from an inspection of FIGS. 2 and 3. The rake unit 50 includes a horizontal or base strip 52 having a rib 54 extending centrally along its lower face. At spaced locations, the rib 54 merges or blends into a trio of tines 56. Although perhaps better seen in FIG. 5, which will be described in conjunction with the second embodiment that the invention may assume, it will be pointed out at this stage that each tine has a cruciform cross section. More specifically, each tine 56 has quadrantly positioned ribs 58, each having a flute therebetween. The ribs 58 taper toward the lower end of the tines 56.

Having presented the foregoing information, the manner in which the embodiment depicted in FIGS. 1–3 is used should be readily apparent. The adapter 36, which has the chamfered holes 39 formed therein, is first attached to the end portion of the blade 16 after the holes 28 have been drilled therein, the holes 28 being drilled with a spacing therebetween corresponding to that of the holes 39 (if the holes 39 are provided by the factory). It will be recognized that two such adapters 36 are attached to the undersides of opposite end portions of the blade 16. The adapters 36 can be attached at any time and need not be removed when the rake units 50 are not utilized.

Assuming, however, that a raking operation is to be performed, then after the two adapters 36 have been secured in place by the bolts 30, all that the user need do is to insert the base strip 52 of the two units 50, doing so from the inner end of the adapter 36 in each instance, the inner end being open which permits this. Once inserted, each rake unit 50 can be moved radially outwardly along the blade 16 until the outer end of the base strip thereof engages the end wall 49. It will be appreciated that the wall 49 prevents any outward flinging of its particular rake unit 50 by reason of the centrifugal force that is developed.

After having done the above, then the entire blade 16 can be raised or lowered in the usual manner, such as by raising or lowering the casing 14 relative to the wheels 26, so as to position the lower ends or tips of the tines 56 at the proper elevation for raking. If only leaves are to be raked, then a greater clearance between the lower ends of the tines 56 can be provided than if dead grass is to be raked. Also, inasmuch as the rake unit is composed of linear polyethylene, this being the most advantageous material to be used, the original length of the tines 56 for each unit 50 can be cut to shorten the length to whatever degree or extent is most desirable.

At this point, the two rake units 50, there being one at each end of the blade 16, are in readiness for use. All that the user or operator need do is to move the mower 10 over the area of lawn to be groomed. As the blade 16 rotates, the vane 48, which is beneath the cutting edge 18, literally pushes air on the forward side thereof with the consequence that a partial vacuum is produced on the trailing side. Thus, the tines 56 are continually moving in a region of reduced atmospheric pressure so that the leaves or dead grass are lifted up by the reduced pressure as the blade 16 rotates. Coupled with the scraping of the tines 56 against the turf, it will be seen that if the leaves or dead grass are not immediately raised by reason of the reduced pressure region, then such debris is at least scraped loose so as to enable the particular rake unit 50 mounted on the blade diametrically opposite to sweep up such leaves or grass. This engagement of the debris will result in it being flung outwardly through the discharge spout 24. Although not shown, a suitable bag, such as that used to collect the cut grass during a normal mowing procedure, will collect the leaves and dead grass in a similar fashion.

As far as the embodiment of FIGS. 4 and 5 is concerned, the rake unit 50 is identical. Therefore, it has been assigned the same reference numeral. However, the elongated member to be substituted for the blade 16 is constructed differently, so it has been given the numeral 116. Instead of the adapter 36, the member 116 is formed with a web 138 and downwardly extending integral side walls 140 and 142, each having an inturned flange 144 and 146 thereon as best viewed in FIG. 5. Looked at broadly, the adapter 50, or rather the equivalent construction thereof, is integrally embodied in the member 116, as will be hereinafter more fully explained.

Although a vane, such as the vane 48, could be formed beneath the forward side wall 140, this is a trifle more difficult to provide than with the adapter modification described in FIGS. 1–3. Since the elongated member 116 would be of steel, such a vane could be welded in place. Nonetheless, it is not illustrated. However, it will be noted that there is a downturned flange or lip 149 at the extreme end of the member 116 which is engaged by the horizontal base strip 52 of the unit 50. Thus, the downturned flange 149 functions just as the end wall 49 of the adapter 36 functions. A tang 170 can be struck from the metal of which the member 116 is fabricated, particularly when it is of relatively thin stock; the tang 170 assists in holding the unit 50 in place, mainly resisting any tendency for the unit to work itself radially inward. For the most part, the force is centrifugally outwardly and the tang 170 is only a refinement that lends itself to incorporation into the blade 116 in that the member 116 is logically of steel.

Once in position, the unit 50 appearing in FIGS. 4 and 5 is used in the same identical manner as the unit of FIGS. 1–3. Consequently, the operational description given in connection with FIGS. 1–3 need not be repeated. It is just that in some situations, the embodiment of FIGS. 1–3 will possess greater merit than the embodiment of FIGS. 4 and 5, the converse being true in other situations. The member 116, as believed evident, would be provided with holes, so that it could be readily substituted for the blade 16, it only being necessary to remove the bolts 23, and then retighten these bolts after the substitution.

I claim:

1. A rake device for attachment to an elongated member rotatable by the drive shaft of a rotary power mower comprising a plastic rake unit including an elongated flat strip of lesser length than the elongated member to which it is to be attached, said flat strip being adapted to underlie an end portion of said member, and longitudinally spaced tines integral with said strip and projecting perpendicularly from one side thereof, said tines having a width less than that of said strip at their attached ends adjacent said one side of the strip, said tines tapering toward their free ends.

2. A device in accordance with claim 1 in which said tines taper inwardly with respect to the sides of said strip and inwardly with respect to each other.

3. A rake device in accordance with claim 2 in which said tines are formed with a plurality of angularly disposed ribs extending along the length thereof to provide a cruciform cross section.

4. A rake device in accordance with claim 1 including a horizontal rib extending integrally along said one side of the strip and connecting with said tines.

5. A rake device in accordance with claim 4 in which each tine has at least one rib merging with the said rib extending along said one side of the strip.

6. A rake device to be rotated by the drive shaft of a rotary lawn mower comprising a generally channel-shaped member including a flat web and downwardly extending side walls having inwardly directed portions forming an elongated opening therebetween, and a rake unit including a strip portion receivable between said side walls in a confronting relation with said web, and a plurality of tines projecting from said strip portion through said opening for performing a raking operation as said drive shaft rotates.

7. A rake device in accordance with claim 6 including an obstruction element at the outer end of the web of said channel-shaped member for engaging said strip portion and preventing said unit from being flung centrifugally outwardly.

8. A rake device in accordance with claim 6 in which a blade is attached to said drive shaft and said channel-shaped member constitutes an adapter attached to the underside of said blade.

9. A rake device in accordance with claim 6 in which an elongated member is attached to said drive shaft and said channel-shaped member constitutes an integral portion of said elongated member.

10. A rake device in accordance with claim 6 in which said rake unit is of plastic material.

11. A rake device in accordance with claim 10 in which said plastic is linear polyethylene.

12. A rake device in accordance with claim 6 including a vane element extending downwardly from one of said side walls, said vane element extending beneath the inwardly directed portion at the lower edge of said one side wall.

13. A rake device in accordance with claim 12 in which said vane element curves downwardly and in a direction away from said inwardly directed portion.

* * * * *